United States Patent [19]

Brearley et al.

[11] Patent Number: 5,002,343
[45] Date of Patent: Mar. 26, 1991

[54] TRAILER BRAKE CONTROL FOR TOWING VEHICLES HAVING ELECTRONIC BRAKE CONTROL

[75] Inventors: Malcolm Brearley, Solihull, England; Dennis J. McCann, Powys, Wales; Richard B. Moseley, Cubbington, England

[73] Assignee: Lucas Industries public limited company, Birmingham, England

[21] Appl. No.: 481,218

[22] Filed: Feb. 20, 1990

[30] Foreign Application Priority Data

Feb. 25, 1989 [GB] United Kingdom ................. 8904365

[51] Int. Cl.$^5$ ............................................... B60T 7/20
[52] U.S. Cl. ....................................... 303/7; 188/3 R; 188/112 R; 303/22.1; 303/100
[58] Field of Search ................... 188/3 R, 3 H; 303/3, 303/6.01, 7, 8, 9.67, 9.69, 15, 16, 22.1, 100

[56] References Cited

U.S. PATENT DOCUMENTS

| | | | |
|---|---|---|---|
| 4,763,958 | 8/1988 | Öhrgard | 303/8 |
| 4,804,234 | 2/1989 | Gee et al. | 303/7 |
| 4,818,035 | 4/1989 | McNinch, Jr. | 303/7 |

Primary Examiner—Duane A. Reger
Attorney, Agent, or Firm—Scrivener and Clarke

[57] ABSTRACT

An electronic braking system for a towing vehicle for towing a standard semi-trailer without such a braking system has a separate pressure control channel for the generation of trailer brake pressure whenever the towing vehicle is braked or if the parking brake of the towing vehicle is applied. The pressure signal level set in the towing vehicle is a function of the driver's electrical demand signal, compensated for trailer load and operating gradient. The compensation for trailer load is evaluated by assessing the total trailer mass from measurements of towing load during acceleration and substracting from this value the portion of the trailer load being supported by the towing vehicle as sensed by vertical force protection means on the towing means.

21 Claims, 7 Drawing Sheets

OPEN LOOP TRAILER SERVICE BRAKE LINE PRESSURE SETTING ROUTINE

| VEHICLE RETARDATION | TRAILER THRUST LEVEL | ACTION | |
|---|---|---|---|
| | | TOWING VEH. | TRAILER |
| LOW | THRUST BELOW SET-BAND | BOOST | HOLD |
| | THRUST IN SET-BAND | BOOST | BOOST |
| | THRUST ABOVE SET-BAND | HOLD | BOOST |
| HIGH | THRUST BELOW SET-BAND | HOLD | REDUCE |
| | THRUST IN SET-BAND | REDUCE | REDUCE |
| | THRUST ABOVE SET-BAND | REDUCE | HOLD |

TRAILER BRAKE CONTROL FOR TOWING VEHICLES HAVING ELECTRONIC BRAKE CONTROL

DESCRIPTION

The present invention relates to electronic brake control (EBS) systems and is concerned in particular with the control, in towing vehicles having EBS facilities, of standard semi-trailers, i.e. ones that are not themselves fitted with their own EBS system.

In such arrangements, the braking demand signalling to the trailer, which is coupled to the towing vehicle (or "tractor") by a towing link, is in the form of a pneumatic pressure signal which is provided by the EBS system on the towing vehicle. This trailer brake demand pressure has to be adjusted to suit the operating conditions encountered by both the towing vehicle and the trailer and it is an object of the present invention to provide a control system on the towing vehicle wherein the control of the trailer braking is optimised.

In accordance with one aspect of the present invention, there is provided an electronic braking system in a motor vehicle capable of towing a standard semi-trailer, the system being adapted to provide a separate pressure control channel for the generation of a trailer service brake pressure signal in the event that a driver braking demand is sensed at any axle system of the towing vehicle or in the event that the parking brake of the towing vehicle is applied, the pressure signal level being set in the towing vehicle so as to be a function of the driver's electrical demand signal, compensated for trailer load, the compensation for trailer load being evaluated by assessing the total trailer mass from measurements of towing load during acceleration and substracting from this value the portion of the trailer load being supported by the towing vehicle as sensed by vertical force detection means on the towing vehicle.

In a preferred embodiment, the mass which the trailer brakes are expected to decelerate at the level being demanded by the driver is taken into account by forming the product of non-supported trailer load and deceleration demand and scaling this figure with the trailer pressure constant Pct to give a pressure level at the trailer coupling head which is passed as an input to the trailer service brake system.

The open loop feedforward nature of this signalling system can be improved by feedback signals sensed from trailer thrust measuring means comprising a longitudinal force sensor, located on the towing vehicle. This longitudinal force sensor is subjected to a clear thrust during braking since a substantial component of the trailer mass is both supported and braked by the towing vehicle (tractor). The supported component is measured by vertical load sensing means on the tractor coupling and/or rear axle(s). The forces needed to brake this component are calculated to generate a predicted thrust during braking at the demanded deceleration of the whole vehicle. Thus, the largest unknown in braking the vehicle combination, the efficiency of the trailer brake system, is obtained by comparison of the predicted and actual levels of trailer thrust at any achieved vehicle retardation figure. If this comparison generates zero error then the trailer braking contribution is correct, if it is low, the trailer braking level is too high and if the measured thrust is too large the trailer braking level is too low.

The system is improved if the error generated by said comparison is used to adjust the trailer braking on subsequent stops via an adaptive or learning loop in which errors are collected and integrated over several stops and stored in the trailer braking control computer to be incorporated into future service brake pressure calculations. Only if the error is massive, is an immediate correction made to the trailer brake service pressure by the addition of a new component Pci (pressure correction immediate) to supplement the adaptive pressure correction Pta, otherwise adjustments are not made during the course of any stop, because the response of the trailer brakes to small corrections to demand pressure, cannot be guaranteed.

In addition to static levels of brake apportioning, there is a dynamic weight transfer during retardation, for which allowance must be made to tractor and trailer braking levels. For rapid brake applications, the weight transfer is sudden and must be anticipated as load measurements are filtered and respond slowly. Calculated adjustments are made to the open loop brake demand levels of tractor and trailer and can therefore be made with the same speed as the demand level changes in the manner suggested in patent application Ser. No. 8513616.

The calculation of said transfer weight requires a knowledge of trailer parameters which can be widely variable for an EBS equipped tractor which may tow hundreds of different trailers all with varying conditions of loading, which requires assessment.

The assessment preferably commences when weight transfer during acceleration is measured as a reduction of loading imposed by the trailer on the towing vehicle and is used to calculate the ratio of the height of the centre of gravity of the loaded trailer and the effective wheelbase of the trailer, which is used with the demanded, and subsequently the achieved, deceleration to calculate the forward weight transfer of the trailer during braking, and thereby to correct the towing vehicle and trailer service line braking pressures.

Preferably, the system is provided with means for measuring the weight transfer from the trailer axle or axles to the towing vehicle axles during braking, and means for comparing the measured weight transfer with the predicted weight transfer obtained from the calculated trailer mass, deceleration of the vehicle and the calculated ratio of the height of centre of gravity/effective wheelbase of the trailer, so that the error signal thus derived is used adaptively to correct the said ratio which was measured during acceleration or which was assumed.

Preferably, upon the coupling of a new trailer, and thus in the absence of signal levels suitable for calculation of the various parameters, stored trailer parameter values are used in default until suitable values are measured which permit calculations to be made.

In accordance with a second, but related, aspect of the present invention, an adaptive system comprises means for measuring the weight transfer during braking from a towed vehicle to its towing vehicle, and means for comparing the measured weight transfer with a predicted weight transfer obtained by calculation based on trailer mass, vehicle deceleration and the ratio of the height of the centre of mass/effective wheelbase of the trailer, so that the error signal so derived is used adaptively to correct the said ratio for the trailer and is load which was measured during acceleration or which was assumed.

Preferably, in the absence of signal levels which are suitable for calculation of necessary parameters, or upon the coupling of a new trailer, stored trailer parameter values are used in default until suitable values are measured to permit calculation of the parameters.

By way of example only, a specific embodiment of the present invention will now be described, with reference to the accompanying drawings, in which:-

Figure 1:
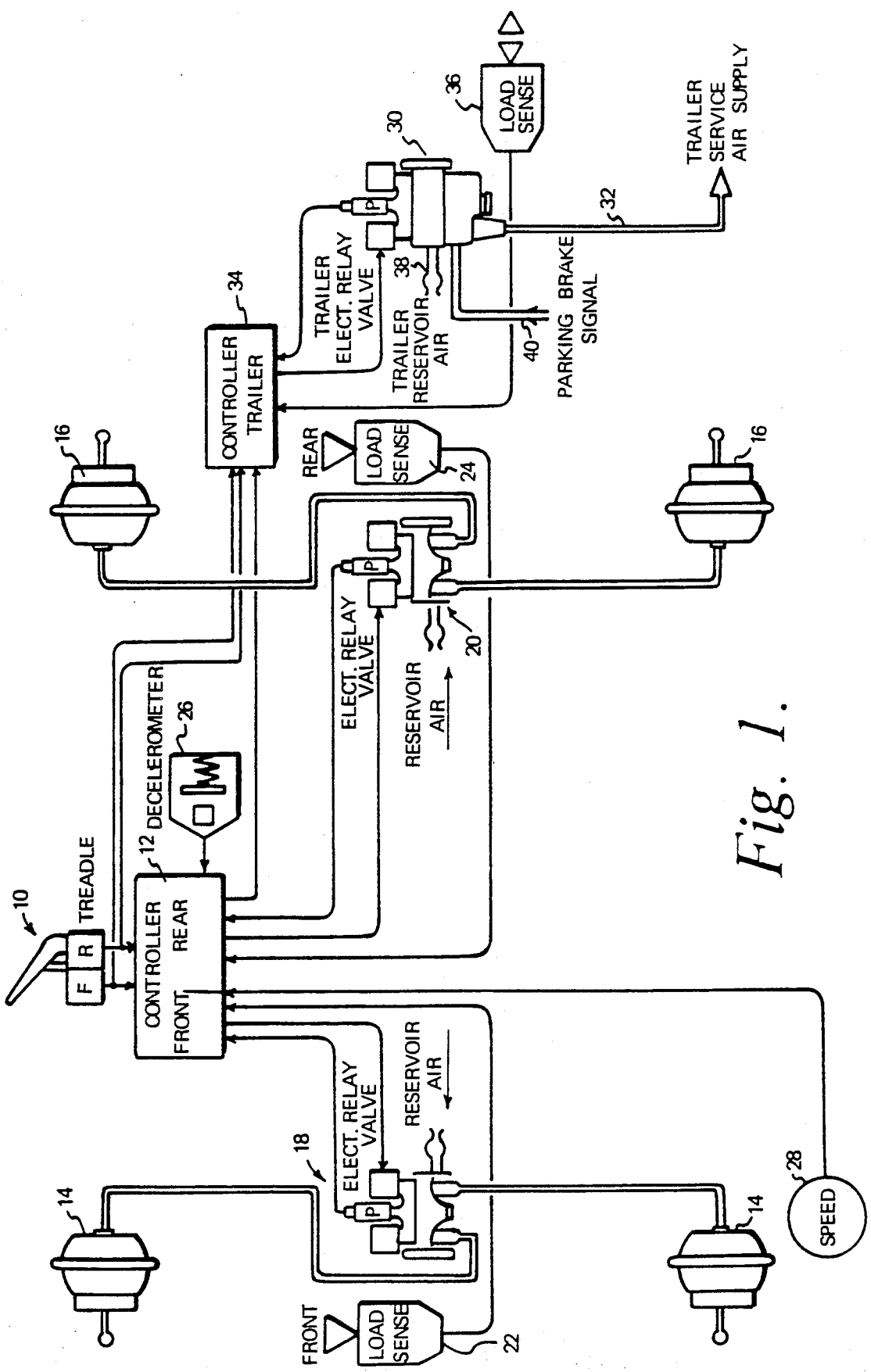
FIG. 1 is a schematic view of an embodiment of vehicle braking system adapted to be fitted with an axle controlled EBS system in accordance with the present invention, for controlling the braking signals supplied pneumatically to a standard trailer (not shown)

FIG. 1 illustrates, inter alia, the main components of a conventional electronic braking system (EBS) which is not described in detail herein. Driver's braking demand signals are generated electrically by a treadleoperated transducer arrangement 10 and supplied to an electronic controller 12 whose front and rear braking pressures are established and fed to front and rear brake actuators 14, 16 via respective relay valves 18, 20. The braking pressures depend upon operating parameters of the vehicle determined, inter alia, by front and rear sensors 22, 24, a vehicle decelerometer 26 and a speed sensor 28.

When a vehicle equipped with such an electronic brake control system (EBS) is adapted to towing a standard semi-trailer, i.e. one not so equipped with its own EBS system, then the brake demand signalling to the trailer is in the form of a pneumatic pressure signal which is provided by the EBS system on the towing vehicle. For this purpose, in addition to the basic components mentioned above, the system also includes a separate relay valve 30 for supplying a pneumatic signal to the trailer brakes (not shown) via a trailer service air supply pipe 32 under the control of a trailer brake controller unit 34. The trailer brake demand pressure must be adjusted to suit the trailer load as assessed on the towing vehicle by processing the signal from a load sensor 24 and to compensate for the operating gradient which is measured by the EBS system. EP 0205277A shows one known way of compensating for the operating gradient in an EBS system. In addition to the trailer brake being applied when there is a driver's foot demand signal generated in either of the towing vehicle braking circuits if there is more than one, generation of a trailer brake signal will also occur when the parking brake of the towing vehicle is applied.

The braking circuitry of an axle-controlled EBS vehicle shown in FIG. 1 is thus provided with an extension to its pneumatic circuit and to its electronic control system in order to provide a suitable trailer brake control channel compatible with current trailer systems.

The conventional truck EBS, for example, is a split system having regard to both its pneumatic circuits and to its electronic control provisions in order to comply with existing safety standards. The brake pedal transducers, the controller and power supplies are duplex and the pneumatic circuits are separate and individual for each axle. These principles are continued when the trailer supply subsystem is added in that the control valve 30 for the trailer supply is fed via pipework 38 from its own trailer supply reservoir (not shown), the latter valve 30 having either an integrated or a separate control element which accepts the inverse air parking brake signal via a line 40 to convert this to a trailer brake signal in the line 32. This trailer brake control system is fed with signals direct from each brake pedal transducer, in parallel with the feeds to each axle control channel and the whole trailer braking circuit is fed with battery power from both main and auxiliary batteries in order that this subsystem will maintain operational control in the event of either axle system failing.

Figure 2:
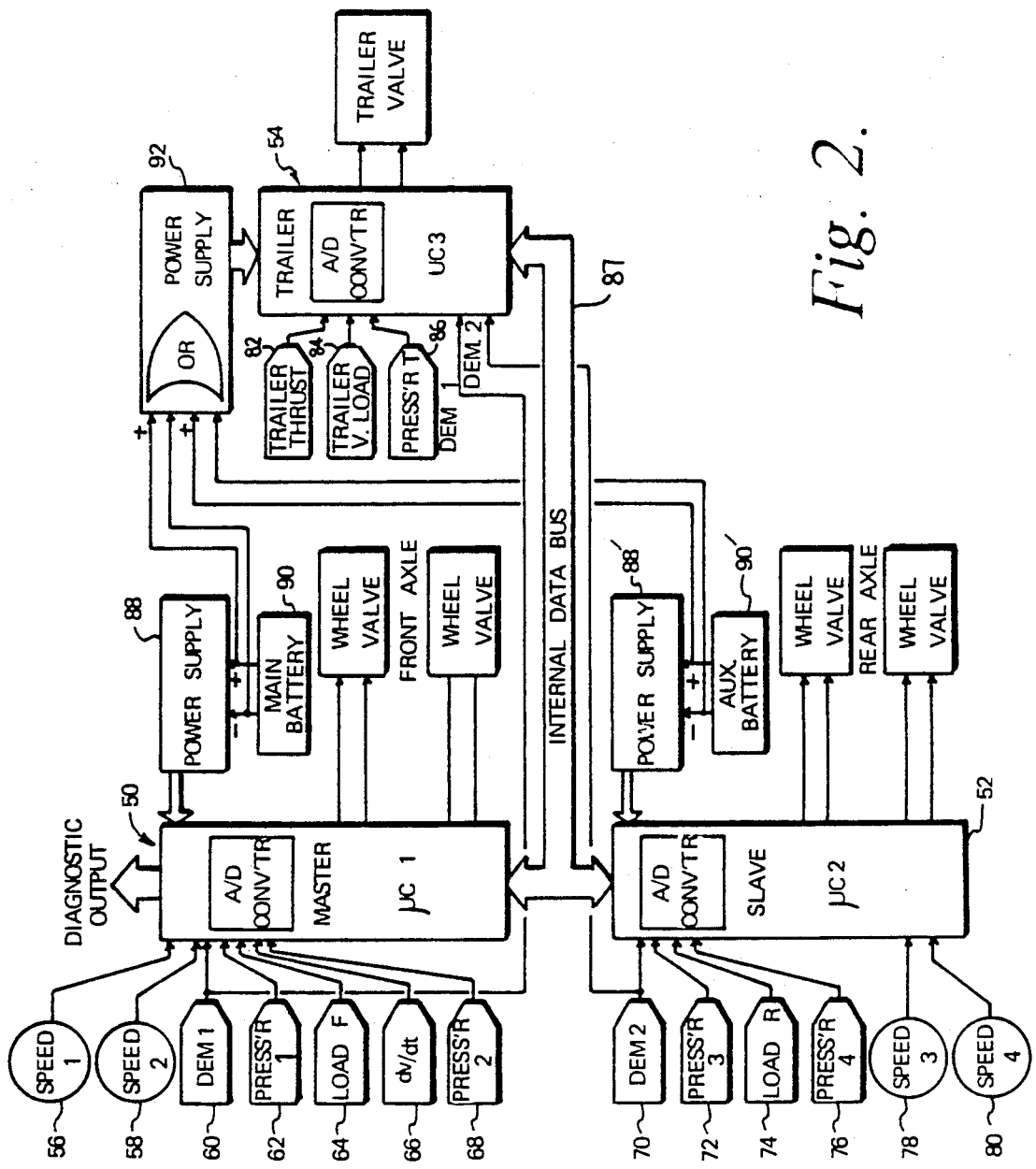
FIG. 2 is a schematic representation of the construction of the controller of FIG. 1.

FIG. 2 shows in more detail the construction and operation of the trailer channel controller 34, from which it can be seen that the controller comprises master and slave microcomputers 50,52 and a third, trailer valve control microcomputer 54. The master microcomputer has inputs 56,58 from each of the front wheels of the towing vehicle, supplying signals corresponding to the speeds thereof, an input 60 feeding the signal DEM1 (the driver demanded signal, via a first channel), an input 62 supplying a signal corresponding to the brake pressure PRESS R1 in a first front wheel channel, an input 64 supplying a signal corresponding to the towing vehicle front axle load measurement, an input 66 supplying an acceleration signal dv/dt, and an input 68 supplying a signal corresponding to the brake pressure PRESS R2 in a second front wheel channel.

The inputs to the slave microcomputer 52 are an input 70 feeding the signal DEM 2 (the driver demanded signal, via a second channel) an input 72 supplying a signal corresponding to the brake pressure PRESS R3 in a first towing vehicle rear wheel channel R3, an input 74 supplying a signal corresponding to the load R as measured by the rear load sensor 24 (such as that disclosed in U.K. patent application 8905251, an input 76 supplying a signal corresponding to the brake pressure PRESS R4 in a second tractor rear wheel channel R4, and inputs 78,80 from each of the towing vehicle rear wheels, supplying signals corresponding to the speed thereof. Instead of a separate rear load sensor 24, the required value may be obtained from the increased values of the tractor axle loads.

The driver demanded signals DEM1, DEM2 are also fed to the trailer valve control microcomputer 54, which also has inputs 82,84,86 receiving signals corresponding to the trailer thrust from sensor 36, the trailer vehicle load (to be described hereinafter) and the pressure supplied by the trailer sub-system.

Each microcomputer 50,52,54 is provided with an analog to digital converter to convert analog signals into digital form, and the three microcomputers are linked by an internal data bus 87. The three microcomputers 50,52,54 are provided with their own power supplies 88,88' and 92, fed by the main battery 90, an auxiliary battery 90' and a combination of the two respectively, for safety reasons.

The trailer channel controller 34 sets the open loop trailer braking pressure in line 32 from the driver's braking demand, compensated for operating gradient and for trailer load being carried allowing for forward weight transfer during braking. The trailer channel controller 34 also has an input from the force sensor 36 (such as that disclosed in U.K. patent application No. 8905251), which measures the pushing or pulling load on the trailer towing link by sensing a fixture which is attached to the towing vehicle. This signal is used as a further factor in the adaptive regulation of trailer overall braking (to be described hereinafter), wherein electronic processing of this signal combined with the demand, load and gradient factors, sets up an eventual service line braking pressure of such a level as to hold the trailer braking application at a point where there is exerted a thrust substantially equal to that predicted value calculated from the component of the trailer load being supported and braked by the towing vehicle (tractor) multiplied by the achieved vehicle deceleration, in which condition the brake apportioning is correctly distributed between the tractor to trailer.

The trailer braking levels are calculated repeatedly by the EBS system and the trailer control channel in combination in the following way, which enables a picture of the trailer parameters to be built up from measurements made on the vehicle.

1. Firstly, the static axle loads of the towing vehicle are measured before the trailer is connected, and are permanently stored in the vehicle EBS system, or are taken from calibration figures which are stored when the vehicle is built.

2. The static axle loads are measured when the trailer is coupled to the vehicle, and this measurement is repeated whenever static, level conditions apply.

3. On acceleration, the coupling tension is measured from the load sensor 36, and from the force/acceleration relationship, the total trailer mass is calculated, with acceleration level being supplied by the rate of change of wheel speed signals and the vehicle decelerometer 26 in the tractor EBS system.

Figure 3:
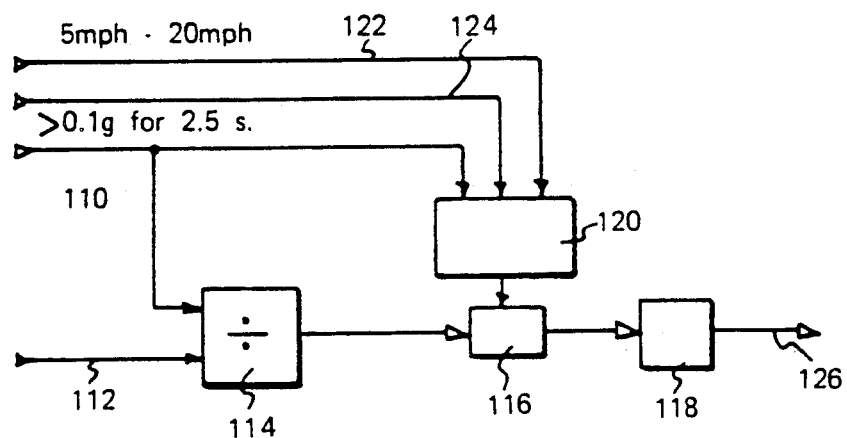
FIG. 3 is a schematic diagram of a trailer mass detector used in the present system.

Trailer mass is calculated using the detector shown in FIG. 3. A vehicle acceleration signal on a line 110 and a trailer coupling tensile load signal on a line 112 are divided in a divider 114 and the result passed, via a switch 116, to a mass store 118. The switch 116 is only opened by a selector 120 on receipt of (a) a vehicle speed signal on a line 122 showing that the vehicle speed lies between two preset speeds, for example 5 mph–20 mph, (b) a sensibly zero gradient signal on a line 124 indicative of the road gradient being substantially zero, and (c) a vehicle acceleration signal on line 110 showing that the acceleration has been for example >0.1 g for at least 2.5 seconds. A signal representative of trailer mass is output on line 126.

4. The increase in axle loading on the tractor is calculated by means of the difference of the values obtained in steps 1 and 2 above, or by reading a vertical load sensor incorporated into the tractor coupling shown as element 84 in FIG. 2, and is stored as that portion of the total trailer weight, which is calculated in step 3 above, which is carried by the tractor.

5. The portion of the total trailer weight being carried by the tractor is subtracted from the total trailer mass to generate the trailer load being carried on the trailer rear axle or axles, and the open loop braking demand is set by the trailer brake controller unit 34 to be dependent on this figure and on the driver's brake demand. As will be explained later, allowance is also made for weight transfer which occurs under deceleration, and which reduces the trailer axle load.

6. The trailer thrust to which the longitudinal load sensor 36 should be subjected is then predicted from calculated forces which the tractor must generate in order to decelerate that portion of the trailer load, corrected for weight transfer, which the vehicle is carrying, at the demanded level.

By knowing the proportion of the trailer weight which is being carried by the towing vehicle, as well as the weight of the trailer itself, it is possible to provide much more accurate values of braking pressure in order to produce effective braking of both the towing vehicle and the trailer.

Another factor which affects the towing vehicle is weight transfer. The EBS system calculates the dynamic loading conditions on the towing vehicle axles during braking, and revises tractor axle braking pressures to suit the loading conditions under the demanded level of retardation. Since the EBS system of the towing vehicle with its trailer control channel has no knowledge of the trailer being coupled, since trailers are subject to considerable variation in dimensions and even numbers of brakes, there is determined in the control routine a sequence of assessments which can be made by the towing vehicle equipped with load sensing means described earlier. This is listed as follows, and the steps are similar to those described earlier in the calculation of the trailer brake demand and expected thrust.

1. The static axle loads of the towing vehicle are measured before and after trailer coupling, and are subtracted to give the trailer load carried by the towing vehicle.

2. Under steady acceleration, the towing vehicle pull is measured, ideally on a level road at low speeds, and the total trailer mass is calculated.

3. Under the acceleration conditions, the weight transfer of the trailer and its load will reduce the vertical loading on the towing vehicle, and figures lower than the static loading are measured. The weight transfer is calculated, and since a total mass is known for the trailer, a dimension ratio h/L (h is the height of the centre of gravity and L is the effective wheel base of the trailer from the coupling pin to the rear axle or axles) for the trailer can be calculated. The h/L ratio calculated during a significant acceleration period updates any stored default value and is used during subsequent braking when an increase of trailer loading on the towing vehicle will be predicted.

4. Under braking, the trailer weight transfer is onto the towing vehicle, and is proportional to vehicle deceleration. The apparent increase in the towing vehicle axle weight allows more braking to be directed to the towing vehicle, particularly to the rear axle which receives the majority of the dynamic load. The h/L factor as determined under acceleration for the trailer and its load is thus used to calculate the weight transfer under deceleration, using the trailer mass again as calculated in step 2 above, and the measured vehicle deceleration.

5. The load increase on the towing vehicle causes more braking effort to be directed towards the towing vehicle, and a corresponding amount of braking effort is removed from the trailer rear axle demand.

6. The reduced trailer braking demand also increases the predicted trailer thrust to be detected by the sensor 36, as more braking is taking place at the towing vehicle to achieve the demanded retardation, and this is taken into account in the calculation of the prediction of the thrust at the sensor 36.

7. The towing vehicle rear axle has a weight transfer increase from the trailer, but there is also a weight transfer loss from the rear axle as the tractor mass shifts some load onto the front axle under deceleration, and this must also be taken into account in the tractor EBS controller.

Under favourable conditions, during firm braking, increase in tractor rear axle loading is measured and compared with the predicted load transfer so that correction to the h/L ratio can be made and subsequent predicted values of load transfer can be more accurately calculated for use on less favourable stops such as those over bumpy road conditions, emergency high retardations, or those which involve ABS operation.

Figure 4A:
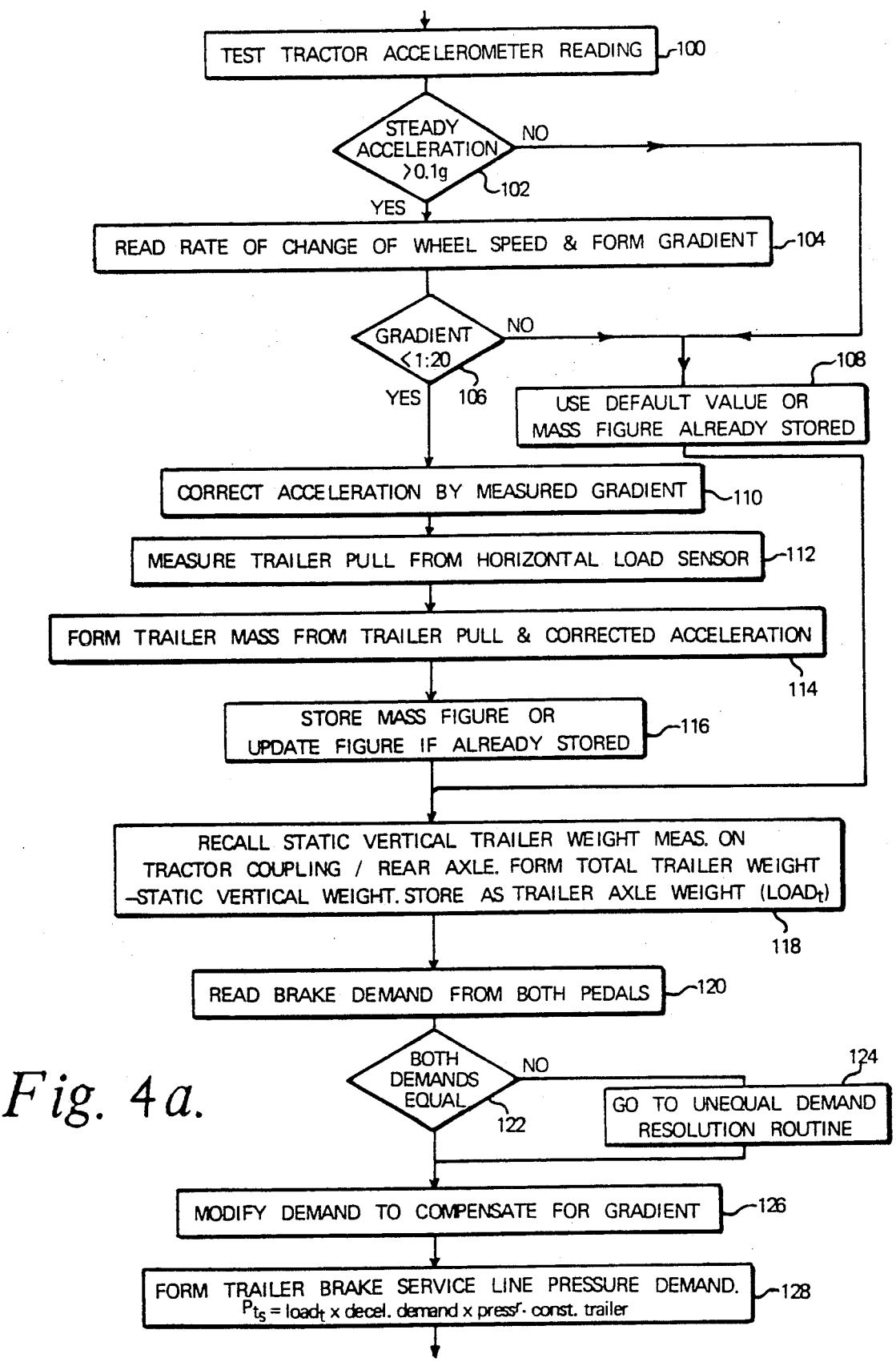
FIGS. 4a and 4b are flow diagrams demonstrating the operation of the system.
Figure 4B:
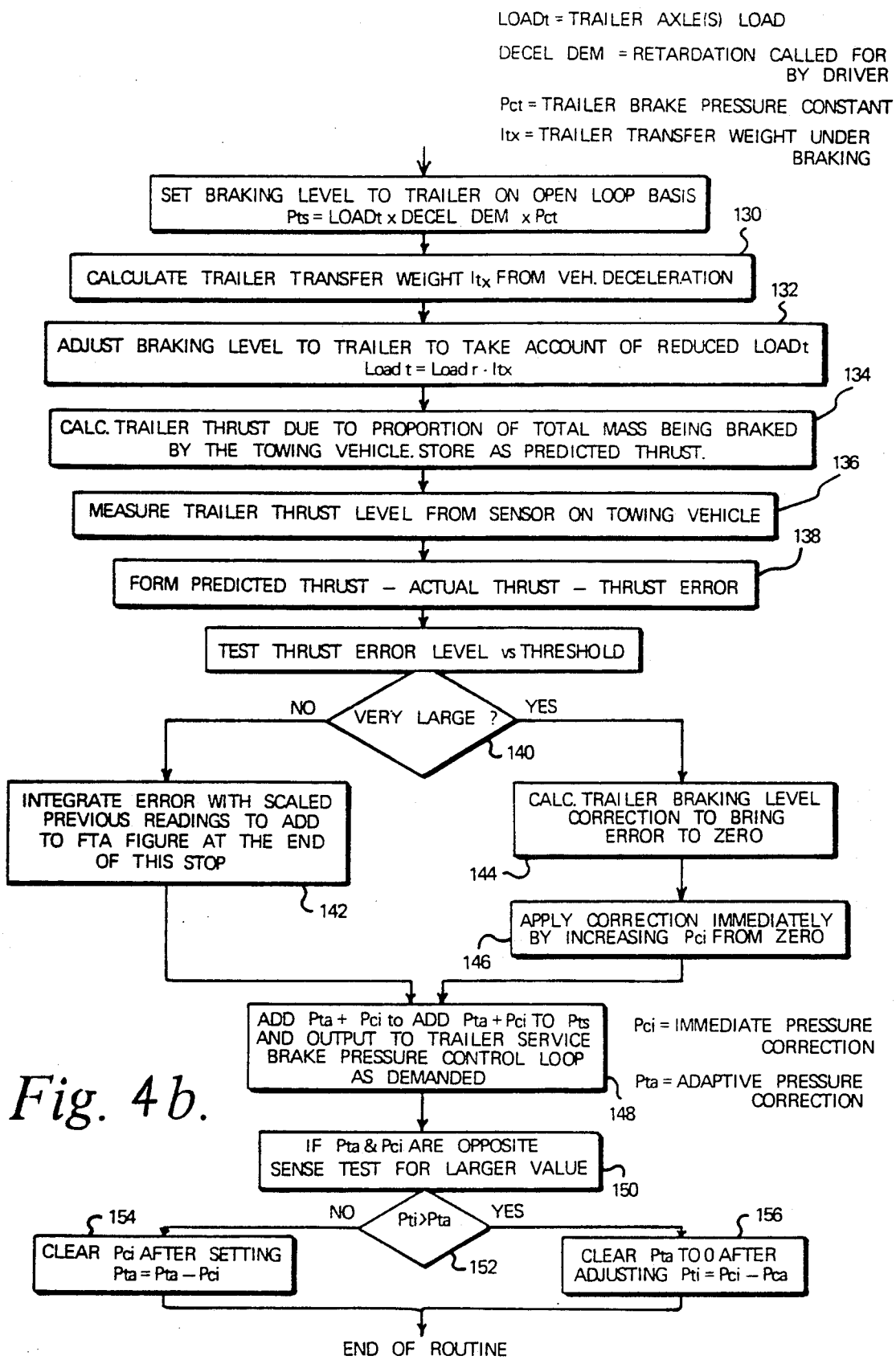

The above calculation of the trailer service brake pressure is illustrated in FIGS. 4a and 4b. At step 100 the acceleration of the tractor is read, and it is decided at step 102 whether the acceleration is steady and greater than a predetermined value, in this example 0.1 g. If the acceleration does not satisfy the required conditions, the system proceeds to step 108, where a default value or previously stored mass figure for the mass of the trailer is used. If the acceleration satisfies the conditions, step 106 determines the gradient upon which the tractor is travelling. If the gradient exceeds a predetermined value (e.g. 1:20 or 5%) the conditions are not considered to be "level", and the system proceeds to the aforementioned step 108.

If the gradient is within the predetermined value, the measured acceleration is corrected at step 110 to take account of the gradient. At step 112 the trailer pull is measured from the horizontal load sensor 36. The trailer mass is calculated at step 114 from the measured pull and the corrected measured acceleration, and the mass figure thus obtained is stored, or used to update previously stored values, at step 116.

At step 118, the mass figure obtained at step 116, or alternatively from step 108, is used in conjunction with the stored static vertical trailer weight measured on the vertical force sensor 24 on the tractor to form a value for the trailer axle weight, by subtracting the static measured vertical weight from the total calculated trailer weight.

At step 120, the brake demand is read from both pedal channels, and at step 122 it is decided whether the demands are equal. If unequal, an unequal demand resolution routine (which will not be further described) is initiated, otherwise, the demand is modified at step 126 to compensate for the gradient and is used at step 128 in conjunction with the trailer axle load and the trailer pressure constant to form the trailer brake service line pressure demand.

Referring now to FIG. 4b, the braking level calculated in the routine of FIG. 4a is stored, and at step 130 the trailer transfer weight is calculated on the basis of the vehicle deceleration. The previously calculated braking level is then adjusted at step 132 to take into account the reduced load on the trailer axle(s). At step 134, the trailer thrust at sensor 36 due to the braking of a portion of the trailer mass by the tractor is calculated and stored as the predicted thrust. The actual thrust is measured at step 136 and the two values are compared at step 138, to produce a thrust error.

At step 140, the size of the thrust error is analysed. If the error is not very large, it is integrated at step 142 with previous scaled readings and added to the adaptive pressure correction at the end of the stop. For a large error, the system calculates at step 144 the trailer braking level correction required to bring the error to zero, and the correction is immediately applied at step 146 by increasing the immediate pressure correction Pci from zero.

The adaptive pressure correction Pta and the immediate pressure correction Pci are added at step 148 and output to the trailer service brake pressure control loop as the demand. If the two corrections are of opposite sense, step 152 determines which is the larger. If Pci>Pta, Pci is cleared from the system at step 154 after setting the adaptive pressure correction to be Pta−Pci. On the other hand, if Pci>Pca, Pta is set to zero at step 156 after setting the immediate pressure correction to be Pci−Pta.

By the means described, the trailer service brake pressure control channel is adjusted to generate, over a series of stops, the predicted trailer thrust by an adaptive loop taking an input from thrust errors derived from the predicted figures minus the actual values of thrust as measured on the towing vehicle. This adjustment aims to set levels of trailer braking demands which produce known braking performance levels in spite of unknown values of braking efficiency on different trailers being towed by the same towing vehicle. Removal of a trailer is detected by load change or trailer circuits becoming open circuit on a coupling, and this will provide the signal to reset the adaptive parameter or parameters back to nominal values ready for a new trailer to be coupled. After a series of significant stops, the adaptive parameter or parameter array will be set to a value which gives the correct level of braking, taking into account the proportion of the mass of the trailer and load carried by the towing vehicle and also taking into account the weight transfer during braking, and this value will indicate the trailer braking capability.

If this capability is substantially below the expected (and legislative) level and high levels of brake boost are being generated to achieve the required retardations, a warning will be produced to inform the driver of the towing vehicle that urgent attention is required.

EBS systems operating as outlined in UK patent application No. 85 13616 are characterised in setting brake pressures as determined by driver demand and compensated for gradient and axle or bogie loads and then measuring the effectiveness of these provisions in terms of vehicle retardation produced. Retardation errors, derived by subtracting measured vehicle deceleration levels from the corresponding driver braking demands, are used to adapt the feed forward control loops over a series of stops until braking pressures are adjusted so that apportioning is correct and overall vehicle retardation is equal to the level demanded. The adaptive correction then being made is a measure of the overall braking effectiveness of the vehicle. When such a vehicle tows a trailer two adaptive loops are appropriate and are maintained separately through measurements of braking distribution and overall retardation. The braking distribution is assessed from measurement of longitudinal force between towing vehicle and trailer which then controls the trailer braking. This adaptive loop is adjusted by trailer thrust errors measured during each significant stop made by the combined vehicle. At the same time, the towing vehicle adaptive loop is adjusted and this is done in a co-ordinated manner by making an allowance for the trailer error in the towing vehicle correction signal which is formed from the combined vehicle retardation errors calculated by the EBS computer. This prevents interaction between the two adaptive loops and the operation is briefly described below.

Figures 5, 6:
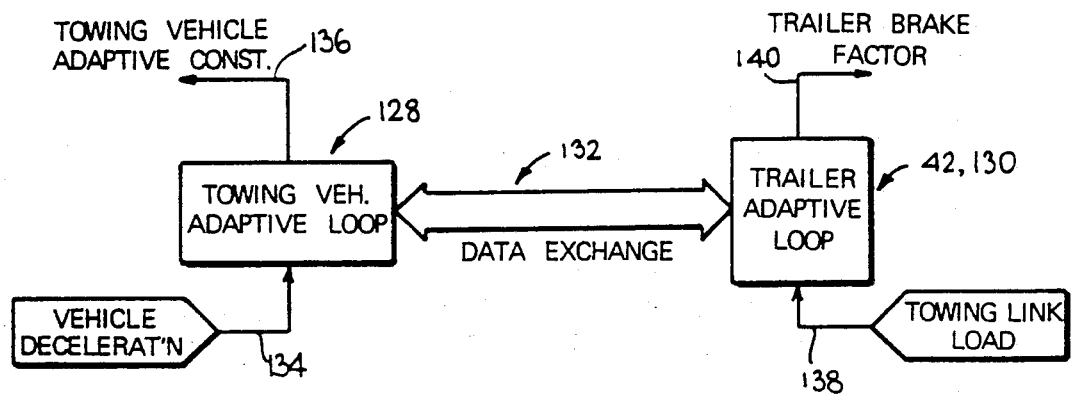
FIG. 5 is a schematic diagram illustrating two adaptive control loops used in the present system.
FIG. 6 is a table illustrating possible braking error combinations and the action taken by the system to obtain correcction.

The measurement of trailer coupling force is used to calculate an allowance which is to be made in the assessment of satisfactory towing vehicle braking performance. This is achieved by dividing trailer coupling force by towing vehicle mass as obtained from the axle load sensors, to yield an expected acceleration error. This signal is introduced into the towing vehicle adaptive loop deceleration error calculation as an allowance for the trailer disturbance and, as shown in the table of FIG. 6 (which tables the possible braking error combinations and the remedial action which will be taken in order to correct trailer compatibility first and overall vehicle retardation subsequently) adjustment is not made on the towing vehicle for errors which will be corrected by adapting trailer braking so as to reduce the trailer coupling load signal to a low level. The towing vehicle adaptive brake adjustment loop is driven from deceleration error defined as:

$$\text{Deceleration Demand} - \text{Actual deceleration} - \frac{\text{Compression Force}}{\text{Towing Vehicle Mass}}$$

Figure 7:
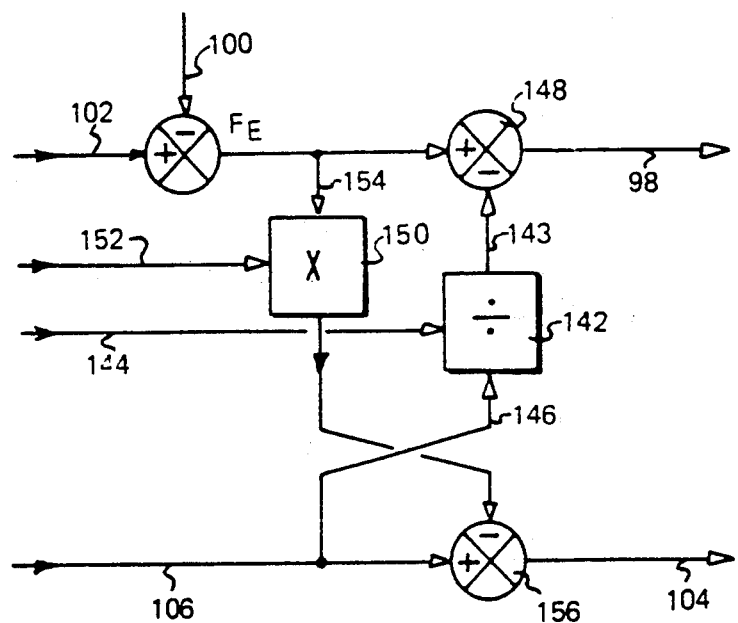
FIG. 7 shows more detail of one possible embodiment of the two adaptive control loops of FIG. 5.

This is achieved, as shown in FIG. 7, by introducing to a divider 142 a "towing vehicle mass" signal on a line 144 and the trailer coupling load by way of the line 106 and a line 146. The resulting quotient is introduced via line 143 to a subtracting element 148 where it is subtracted from the deceleration error $F_E$.

Now taking the case where the towing vehicle braking is seriously impaired which results in the overall vehicle deceleration being low but the coupling load measurement is in substantial tension. The trailer braking is adapted on the basis of trailer coupling force, which should eventually be reduced to zero. This would, without modification, cause incorrect reduction in trailer braking unless an allowance is made for the low deceleration of the vehicle. The deceleration error formed from demand - actual deceleration is multiplied by the trailer mass to generate a force allowance which is subtracted from the coupling tension, drastically reducing the trailer brake adaptation which would otherwise have taken place.

This is achieved, as shown in FIG. 7 by introducing to a multiplying element 150 the trailer mass signal on a line 152 and the deceleration error $F_E$ on a line 154, the result being directed to a subtracting element 156 where it is subtracted from the trailer coupling load signal present on line 106.

However, in some cases the trailer mass figure may not have been calculated so that the above allowance cannot be made. In this case an alternative strategy is adopted which uses the logic circuit of FIG. 8 to inhibit the trailer adaptive loop. The logic circuit detects the conditions under which trailer adjustment on prevailing coupling load signals, would be wrong. The circuit detects the combination of either:

(a) the coupling being in tension and actual deceleration being low, or (b) the coupling being in compression and actual deceleration being high. In either case, the logic circuit causes the trailer brake adaptive control loop to be switched off.

Figure 8:
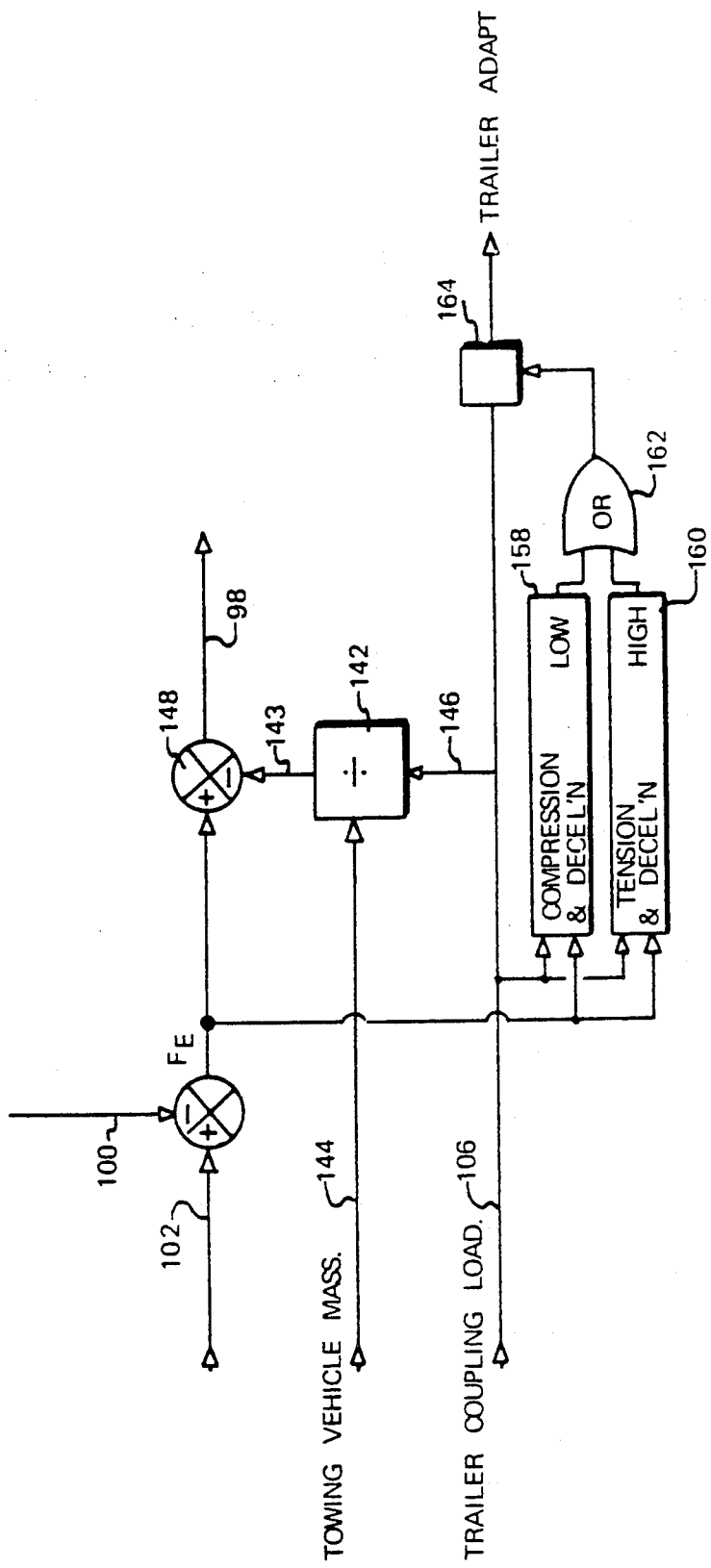
FIG. 8 shows more detail of a second possible embodiment of the two adaptive control loops of FIG. 5.

This is achieved as shown in FIG. 8 in that, whereas the components and arrangements associated with the establishment of the towing vehicle adaptive constant are identical to those of FIG. 7, the deceleration error signal and trailer coupling load are both connected to the inputs of the two comparators 158, 160. The comparator 158 responds to the condition that the coupling is in compression and the deceleration error is positive and the comparator 160 responds to the condition that the coupling is in tension and the deceleration error is negative. The comparator outputs are fed via an OR gate 162 to the control input of a switch 164 which selectively switches on the trailer adaptive constant in the event of either one or other of the comparators being triggered.

The system is programmed with default values for h/L, median mass and a proportion k of total trailer load which acts on the towing vehicle so that in the absence of acceptable calculated values of these parameters, nominal braking levels can be applied to the trailer in much the same way as is currently effected by simple pneumatic means.

The absence of calculated values results from sensor failure or from coupling of a trailer whilst on a steep gradient or acceleration which is too gentle to produce adequate signals for assessment of mass totals and weight transfer. This would leave load to be assessed from towing vehicle axle load increase above the stored towing vehicle only figures or from tractor coupling vertical load measurements 84 and the total mass would be calculated from this load divided by the fraction k carried on the towing vehicle. In these circumstances the weight transfer calculation and the adaptive loop operations on both the towing vehicle and trailer are suspended until acceptable measurements have been completed.

When acceleration measurements generate acceptable mass figures which agree with the towing vehicle load increase divided by the proportion of trailer load being carried, the system is enabled to calculate the trailer thrust error and complete the adaptive adjustment loop, but if error levels are high and exceed a preset threshold, correction is made by an immediate adjustment of trailer braking service line pressure in addition to the adaptive adjustment method which is slow since it operates gradually on error values achieved over several stops.

Where a towing vehicle changes trailers, the conditions which were established by adaptive adjustment of the braking control systems may well be changed and the trailer demand system would be in error. Two provisions with dealing with this situation are possible. Firstly, the driver can be provided with a simple electrical key to provide a "New Trailer Signal". Alternatively, detection of the trailer uncoupling action can automatically generate the signal. Either action provides a means for resetting the trailer demand adaptive storage "constants" and any immediate correction used to zero, causing the system to revert back to nominal braking levels on the assumption of normal, standard brakes. Alternatively, the adaptive control in the trailer demand channel is allowed to adapt back towards a level which suits the new trailer. The rate of change of adaptive parameters will be set high, if the trailer braking system shows significant errors in either direction when the new trailer is first braked. Thus, for very large errors in trailer braking where quite significant trailer thrust error loads are generated, the adaptive constant will be changed in ramp fashion during the course of a stop rather than waiting for the more normal inter-stop adjustment accepted for smaller errors.

We claim:

1. An electronic braking system in a motor vehicle capable of towing a standard semi-trailer not having its own electronic braking system, the system comprising:
   a separate pressure control channel for the generation of a trailer service brake pressure signal in the event that a driver braking demand is sensed at any axle of the towing vehicle;
   means for setting the trailer service brake pressure signal level in the towing vehicle so as to be a function of the driver's electrical demand signal, compensated for the trailer load;
   vertical force detection means on the towing vehicle for assessing the portion of the trailer load being supported by the towing vehicle; and
   towing load detection means on the towing vehicle;
   the compensation for trailer load being evaluated by assessing the total trailer mass from measurements of towing load during acceleration and subtracting from this value the portion of the trailer load being supported by the towing vehicle.

2. An electronic braking system as claimed in claim 1, wherein the portion of the trailer load being supported by the towing vehicle is calculated by determining the static axle loads of the towing vehicle before and after the trailer is connected, and subtracting the value for the axle loads when the trailer unconnected from that when the trailer is connected.

3. An electronic braking system as claimed in claim 2, wherein the static axle loads of the towing vehicle with the trailer connected are taken whenever static, level conditions apply.

4. An electronic braking system as claimed in claim 1, comprising vertical load sensing means on the coupling of the towing vehicle.

5. An electronic braking system as claimed in claim 4, wherein a load signal from the vertical load sensing means is read whenever static, level conditions apply.

6. An electronic braking system as claimed in claim 1, wherein the mass which the trailer brakes are expected to decelerate at the level demanded by the driver is braked by forming the product of the nonsupported trailer load and deceleration demand and scaling this figure with a trailer pressure constant to give a pressure level at the trailer coupling head which is passed as an input to the trailer service brake system.

7. An electronic braking system as claimed in claim 1, further comprising force measuring means for measuring the longitudinal force exerted on the towing vehicle by the trailer during acceleration or deceleration.

8. An electronic braking system as claimed in claim 7, comprising means for comparing the predicted thrust under given braking conditions with the actual thrust measured under those conditions.

9. An electronic braking system as claimed in claim 8, wherein any error generated by the comparison of the predicted and actual thrusts during braking is used to adjust the trailer braking on subsequent stops.

10. An electronic braking system as claimed in claim 9, wherein the adjustment is via an adaptive or learning loop in which errors are collected and integrated over several stops and stored in a trailer braking control computer.

11. An electronic braking system as claimed in claim 9, wherein if the said error exceeds a predetermined value, a more immediate correction is made to the trailer brake service pressure.

12. An electronic braking system as claimed in claim 1, further comprising means for calculating the weight transfer from the trailer to the towing vehicle during braking.

13. An electronic braking system as claimed in claim 12, comprising means for calculating the ratio of the height of the centre of gravity of the trailer to its effective wheel base, and means for utilising the said ratio during a subsequent deceleration to predict the forward weight transfer in order to modify the axle and trailer braking pressure signals.

14. An electronic braking system as claimed in claim 13, wherein the ratio calculating means is adapted to calculate the said ratio by a comparison of the reduction of the trailer load being supported by the towing vehicle during a period of acceleration, the value of the acceleration and the calculated trailer mass.

15. An electronic braking system as claimed in claim 11, comprising means for comparing the measured weight transfer during braking with the predicted weight transfer.

16. An electronic braking system as claimed in claim 15, comprising means for using any error in the measured and predicted values to correct the previously calculated ratio of the height of the centre of gravity to the effective wheelbase of the trailer.

17. An electronic braking system as claimed in claim 1, wherein in the absence of signal levels suitable for calculation of parameters to be calculated, stored trailer parameter values are used in default.

18. An electronic braking system as claimed in claim 17, wherein the default values are substituted with values determined by the electronic control system when the signal levels are suitable.

19. An electronic braking system as claimed in claim 1, further including an adaptive system comprising means for measuring the weight transfer during braking from a towed semi-trailer to its towing vehicle, and means for comparing the measured weight transfer with a predicted weight transfer obtained by calculation based on trailer mass, vehicle deceleration and the ratio of the weight of the centre of mass/effective wheelbase of the trailer, so that the error signal so derived is used adaptively to correct the said ratio for the trailer and is load which was measured during acceleration or which was assured.

20. An electronic braking system as claimed in claim 1, wherein the driver's electrical demand signal is additionally compensated for generating gradient.

21. An electronic braking system for a motor vehicle capable of towing a standard semi-trailer not having its own electronic braking system, the system comprising vertical force detection means on the towing vehicle for assessing the portion of the trailer load being supported by the towing vehicle, towing load detection means on the towing vehicle, calculating means for assessing the total trailer mass from measurements of the signal from the towing load detection means during acceleration and for determining a value for the trailer load to be braked by the trailer brakes, sensing means for sensing a driver braking demand at any axle of the towing vehicle, a separate pressure control channel for the generation of a trailer service brake pressure signal in response to sensing of a driver braking demand, and computing means for setting the level of the trailer service brake pressure signal to be a function of the driver's electrical braking demand signal, the trailer load to be braked by the trailer brakes and the operating gradient.

* * * * *